United States Patent [19]

Kelley et al.

[11] Patent Number: 5,018,382
[45] Date of Patent: May 28, 1991

[54] APPARATUS FOR MEASUREMENT AND CALCULATION OF MOMENT OF INERTIA

[76] Inventors: James W. Kelley, 4469 Sunburst Dr., Oceanside, Calif. 92056; Roger D. McWilliams, 3 Dickens Ct., Irvine, Calif. 92715

[21] Appl. No.: 488,220

[22] Filed: Mar. 5, 1990

[51] Int. Cl.$^5$ .......................... G01M 1/12; G01H 1/00
[52] U.S. Cl. ............................................ 73/65; 73/104; 73/383; 73/579
[58] Field of Search ............... 73/65, 383, 104, 580

[56] References Cited

U.S. PATENT DOCUMENTS 3,608,358  9/1971  Holdinghausen et al. ............. 73/65

FOREIGN PATENT DOCUMENTS 0116034  7/1984  Japan ........................................ 73/65

Primary Examiner—Joseph A. Orsino
Assistant Examiner—Franklin V. Nguyen

[57] ABSTRACT

An apparatus for measuring moment of inertia incorporating a torsional pendulum and an analog electronic circuit. The circuit measures the period of oscillation, sets a scaling factor equal to the torsional coefficient of the resilient member, and computes moment of inertia by multiplying the scaling factor by the square of the period of oscillation. The moment of inertia is then displayed in metric units.

1 Claim, 3 Drawing Sheets

APPARATUS FOR MEASUREMENT AND CALCULATION OF MOMENT OF INERTIA

BACKGROUND OF THE INVENTION

This invention relates to mass properties measurement devices wherein the measured parameter is the period of rotational oscillation of a torsional pendulum. In particular, it relates to an apparatus having means for measuring the moment of inertia of an object, such as the head of a golf club, about its axis of rotation, and for displaying the results of such a measurement.

It is well known that for a torsional pendulum in which the rotational axis lies parallel to the gravitational field, the moment of inertia of an object can be expressed as:

$$I = \frac{\chi T^2}{4\pi^2} \quad (I.)$$

where $\chi$ is the torsional constant of the resilient member, and T is the period of oscillation.

The equation may be simplified to $I = AT^2$ (II.), where A is a proportionality constant. Thus I is proportional to the square of the period of oscillation.

The relevant prior art describes measurement systems comprising a torsional pendulum, in which a rotationally oscillating fixture is loaded with the object under test, and a means of timing and displaying the period of oscillation. In addition, methods have been described for computing moment of inertia from such measurements.

U.S. Pat. Nos. 3,693,413 and 4,212,193 propose differing torsional systems, but utilize similar computational techniques, each requiring three distinct period measurements, and the simultaneous solution of three equations in order to determine the moment of inertia of a given test object.

The principal drawback to the previous methods is that none of them afford the user a means of making a direct measurement of moment of inertia. The difficulty with the prior methods lies in the fact that the torsional costant $\chi$, remains an unknown quantity in any single measurements, and must therefore be solved for by the means described in the prior art.

U.S. Pat. No. 4,212,193 proposes alternatively that moment of inertia could be read directly, utilizing the teachings set forth therein, if an arbitrary set of measurement units were adopted. However in recent years, industry has begun to publish moment of inertia specifications for products such as golf clubs in terms of conventional units. Consequently, measurements expressed in arbitrary units, such as those proposed in the prior art, cannot be compared easily to similar quantities expressed in conventional units.

Moreover, the apparatus described in U.S. Pat. No. 4,212,193 produces results that are linear with the period of oscillation, whereas moment of inertia by definition is proportional to the square of the period. The resulting error in the measured value is then proportional to the percent difference between said measured value and that of the calibration standard. More importantly, any calculation based on said measurement would propagate the error.

It is the principal object of the present invention to provide a convenient means for measuring the moment of inertia of an object by (1) measuring the period of the rotationally oscillating system on which said object is loaded, (2) converting said period into a number equal to the moment of inertia of a rotationally oscillating mass, expressed in conventional units, and (3) displaying said number so that the quantity may be evaluated.

SUMMARY OF THE INVENTION

The invention comprises a torsional pendulum, described herein as a rotatable test platform of lightweight construction suitable for supporting a test object, that is mechanically coupled to a spiral coil spring. Said spiral coil spring, the center of same being nearly coincident with the axis of rotation, lies in a plane that is perpendicular to the axis of rotation, and indeed works solely in said plane. Acting as a torsionally resilient member, the spiral coil spring provides a restoring force to said test platform when same has been rotated from its equilibrium position.

The novelty of the present invention resides in the fact that said invention further comprises an electronic circuit which measures the period of oscillation T, and converts that measurement into a number equal to the product of the constant A, times the square of said period. The period of oscillation can be defined as the amount of time required for a pendulum to pass through its equilibrium position two times with the same direction of motion. According to the invention, a photogate produces a squarewave pulse each time the pendulum passes through its equilibrium position. A period generator circuit is employed to generate a pulse of width equal to the period T. A ramp generator circuit, triggered at the beginning of the rotational period by a pulse from the photo-gate and reset at the end of said period by the period generator pulse, generates a linear, time-variant voltage V(t), that can be represented as $V(t) = Kt$ (III.), where K is the voltage rate of change in units of volts per second.

From the teachings of U.S. Pat. No. 3,479,496, the integral of a time variant function can be found by presenting said function to the input of a voltage-to-frequency converter and applying the output of said converter to the input of a pulse counter. Said pulse counter may then be gated so as to provide limits on the integrated function. In the case of the present invention, a voltage-to-frequency converter produces a squarewave signal at a frequency that is a linear function of its input voltage F(V). Said function can be expressed as $F(V) = CV$, where C is the frequency to voltage ratio in units of pulses per second per volt. Input voltage V is provided by the output of the ramp generator, and hence the frequency of said voltage-to-frequency converters can be expressed as $F = KCt$ (IV.). An integration of the signal output from the voltage to frequency converter is performed by a digital pulse counter. The limits of said integration are controlled by gating said pulse counter with the output of a reset/inhibit latch circuit, described elsewhere in this specification, for a period of time equal to T. Expressed mathematically, said pulse counter performs an integration with respect to time on equation IV. such that, $$\int KCt\, dt \,(V.) = KC\int t\, dt = \frac{KCT^2}{2} \quad (VI.).$$

It can be seen that equation VI. is of the same form as equation I, in that the integration of the time variant function yields a result that is proportional to the square of the period of oscillation.

The circuit elements represented by constants K and C are adjustable in such a way that we may let $$\frac{KC}{2} = \frac{\chi}{4\pi^2} = A.$$

It then follows that each count equals one moment of inertia unit, in units of $\chi T^2$ (mass x distance$^2$), which can be read in metric units.

In the preferred embodiment of the invention a liquid crystal display provides a numerical read-out for the digital counter. Alternatively, the output of the digital counter could be applied to the data bus of a computer.

The invention of the embodiment described herein, when constructed of close tolerance, light-weight machine parts, and temperature-stable, precision electronic components, produces measurements which are repeatable to a precision of 0.5% and are accurate within 1% of over a full decade.

DESCRIPTION OF THE EMBODIMENT

Figure 1:
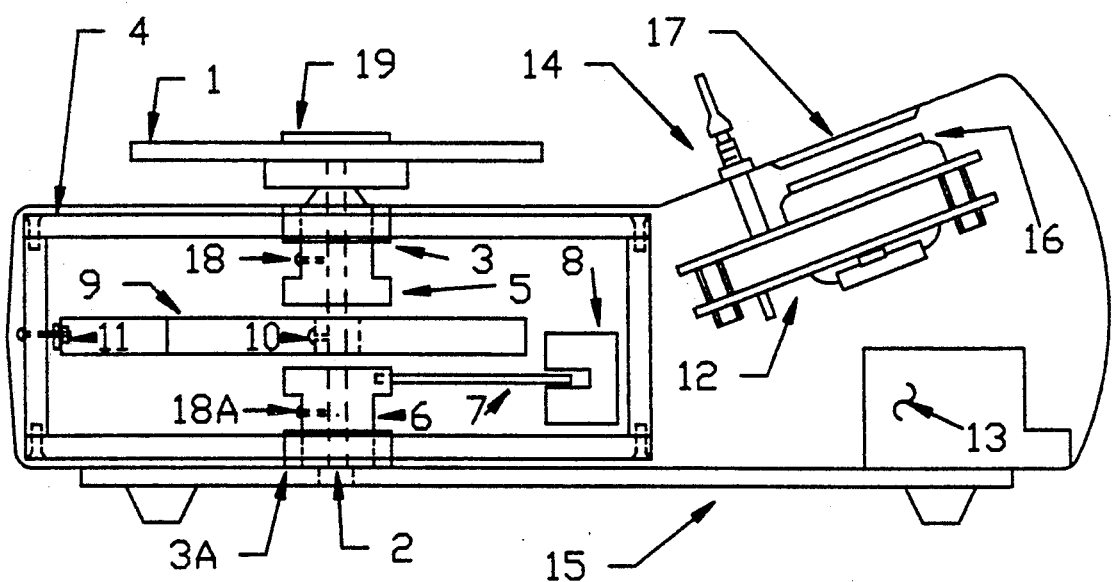
FIG. 1 illustrates the side view of the complete instrument.

Referring now to the embodiment of the subject invention illustrated in FIG. 1, test platform 1, constructed of a lightweight material such as thermoplastic or perforated aluminum so as to have a negligible moment of inertia, is threaded onto connection shaft 2 through its center of mass, thereby defining the axis of rotation of the assembly. Rubber grip 19, cemented onto test plateform 1, provides a mounting surface for a test object. The aforementioned elements, henceforth referred to as the rotational assembly, are positioned with the axis of rotation vertical and allowed rotational freedom by two bearings 3 and 3A having been pressed into the upper and lower plates respectively of sub-chassis 4. Upper shaft collar 55, being fastened to connecting shaft 2 by means of set screw 18, rests against the inner race of bearing 3 thus preventing upward movement of the rotational assembly. Lower shaft collar 6 is secured to connecting shaft 2 by means of set screw 18A, and rests against the inner race of bearing 3A, thereby providing vertical support to said rotational assembly and its load. Interrupt pin 7 protrudes radially from lower shaft collar 6 so as to temporarily obstruct the light path of photo-gate 8 each time said interrupter pin 7 passes through said photo-gate 8 during oscillation. Spiral coil spring 9, made of a band of spring steel, provides a linear restoring torque proportional to the angular displacement of said rotational assembly throughout a reasonable displacement range. Said spiral coil spring 9, lying in a plane perpendicular to the axis of rotation with its central axis coincident with the axis of rotation, fastens tangentially to connecting shaft 2 by screw 10 at one end, and is secured at the other end to sub-chassis 4 by screw 11. Electronic sub-assembly 12 is mounted to enclosure 15 by means of two panel nuts which are threaded onto front panel switches 14. The liquid crystal display 16 is visible through bezel cutout 17.

Figure 2:
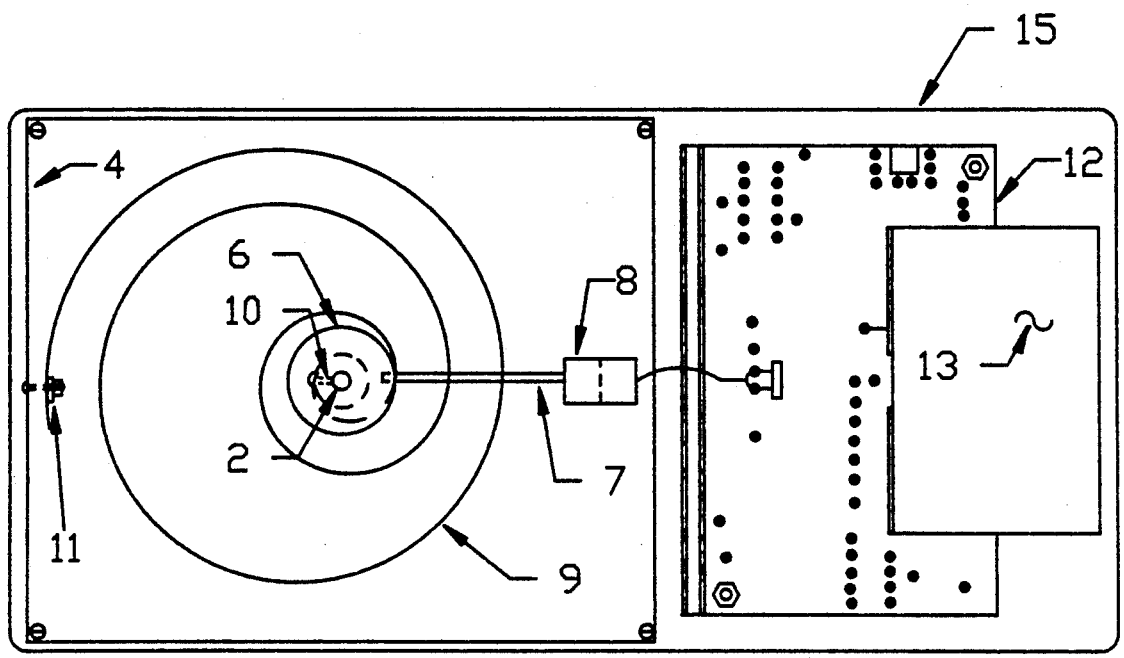
FIG. 2 illustrates the bottom view of the instrument and detail of the resilient member.

FIG. 2 illustrates a view from the bottom of the instrument, detailing in particular the cooperation of spiral coil spring 9, interrupter pin 7, and the photo-gate device 8. As test platform 1 (FIG. 1) is manually displaced from its equilibrium position in a clockwise direction, connecting shaft 2 applies a torque to spiral coil spring 9 resulting in a radial compression of said resilient member. In this position a condition of non-equilibrium exists and spiral coil spring 9 exerts an unbalanced restoring torque on connecting shaft 2, thereby initiating rotation of the assembly toward the equilibrium position in a counter-clockwise direction. The angular momentum of test platform 1 (FIG. 1), loaded with a test object, carriers said rotational assembly beyond the equilibrium position, to an angular displacement approximately equal in absolute value to the initial condition. This condition results in the exertion of an unbalanced restoring torque on connecting shaft 2, thus initiating rotation of the assembly toward the equilibrium position in a clockwise direction. The torsional pendulum thus exercises an oscillatory motion. As the rotational assembly accelerates through the equilibrium position, interrupter pin 7 passes through photo-gate 8 temporarily obstructing the light path, thus generating the requisite timing pulse.

Figure 3:
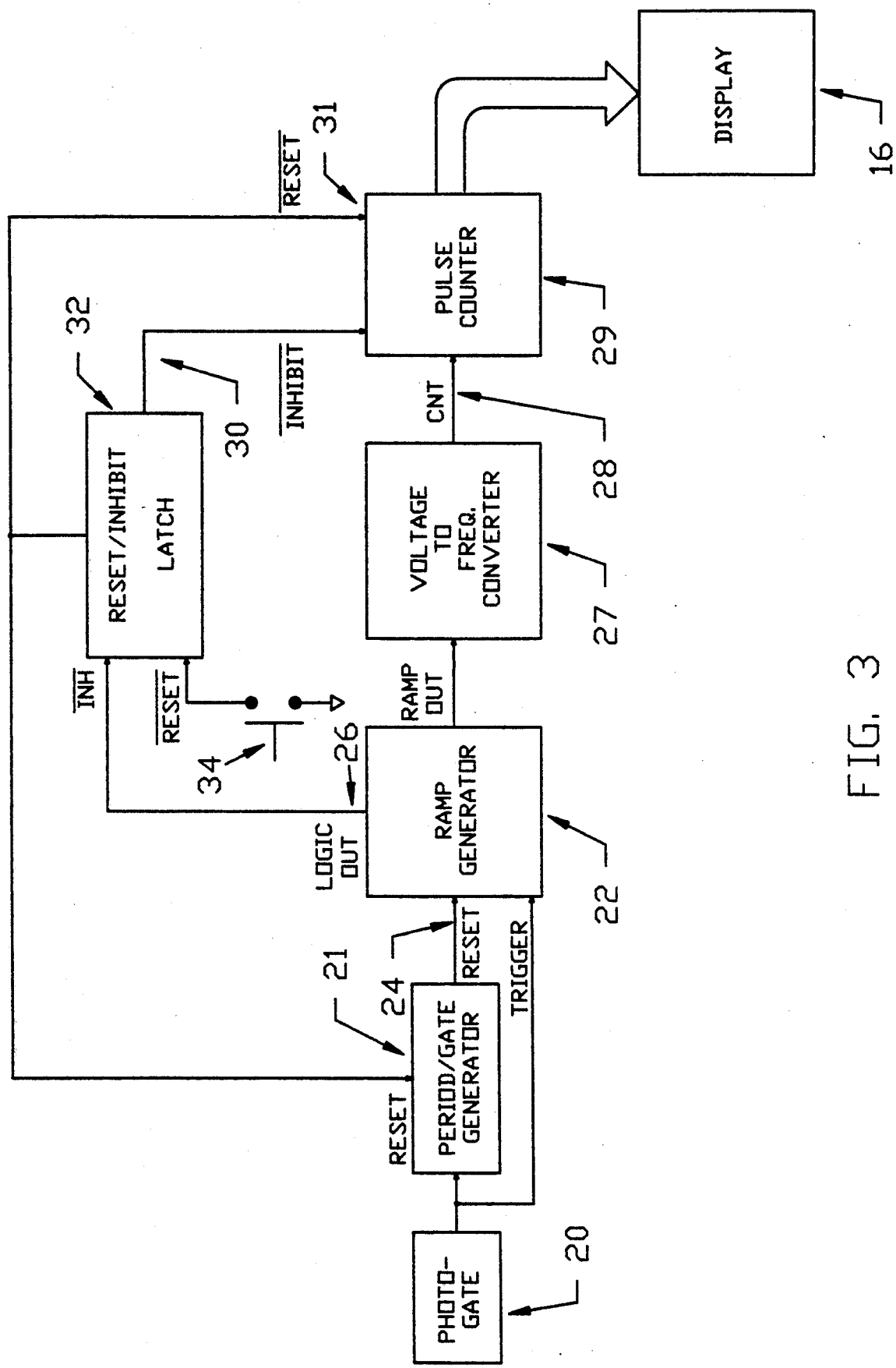
FIG. 3 is a functional block diagram of the electronic circuit.

FIG. 3 is a simplified diagram of the electronic circuit showing interconnection of the circuit elements by way of their respective functions. Reset switch 34 connects to the reset input of reset/inhibit latch 32 simultaneously zeroing and enabling pulse counter 29. Photogate 20 generates timing pulses which are presented to the input of period generator 21, and the trigger input of ramp generator 22. The output from ramp generator 22 drives the input of voltage-to-frequency converter 27 which subsequently produces a squarewave signal of a frequency proportional to the instantaneous voltage at the input ot said V-F converter 27. The output signal from V-F converter 27, comprised of a series of squarewave pulses, is connected to the count input of pulse counter 29. The intersil ICL 7224 is well suited for this purpose. Said pulse counter 29 continuously sums input pulses until period generator 21 resets ramp generator 22. Upon being reset, logic output 26 of ramp generator 22 sets the inhibit input of reset/inhibit latch 32. Inhibit output line 30 from reset/inhibit latch 32 then inhibits pulse counter 29 thus terminating the integration cycle. Output lines from pulse counter 29 feed the inputs of liquid crystal display 16 thus providing a numeric readout.

Figure 4:
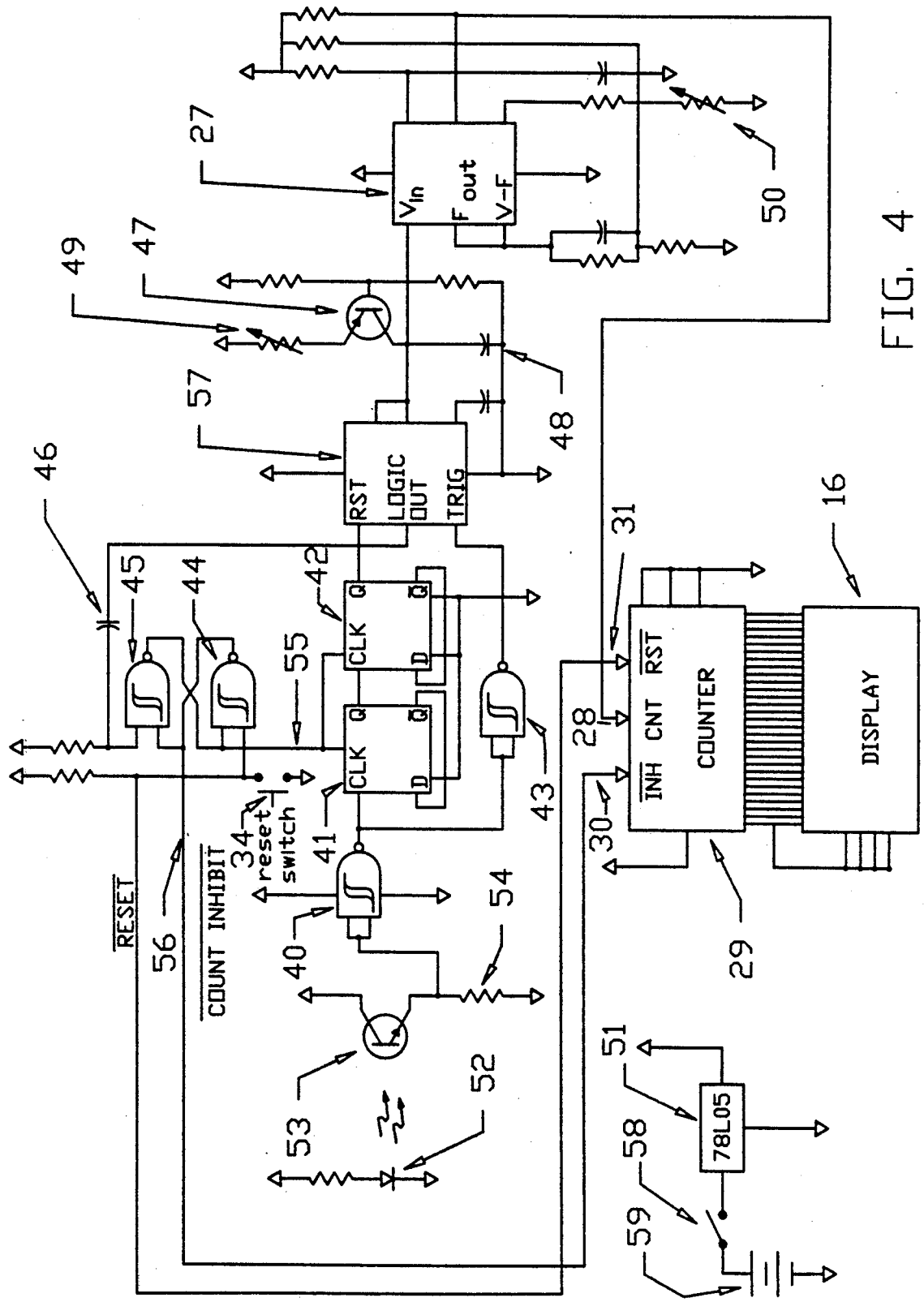
FIG. 4 is a schematic diagram of the electronic circuit.

FIG. 4 illustrates in detail the circuit arrangement of the invention. Reset/inhibit latch 32 (FIG. 3) is comprised of cross-coupled NAND gates 44 and 45. Reset switch 34 momentarily grounds one input of NAND gate 44, resetting counter 29 by sending a logic 0 pulse to reset input 31 of said counter 29. Upon reset, the reset/latch circuit is latched with reset line 55 at logic 0 and count inhibit bar line 56 at logic 1. Photo transistor 53, being sensitive to light issuing from light emitting diode 52, switches current through emitter resistor 54. The voltage pulse produced at the emitter of photo transistor 53 is fed to the coupled inputs of Schmidt trigger NAND gate 40. NAND gate 40 conditions the pulse from photo-gate 20 so as to have a sharp, positive-going leading edge as required by subsequent logic circuits. The output line from NAND gate 40 is fed simultaneoulsy to the clock input of flip-flop 41 and to the inputs of NAND gate 43. The latter buffers and inverts said pulse which it in turn sends to the trigger input of linear voltage ramp generator 22 (FIG. 3). Said ramp generator comprises monostable multivibrator 57, timing capacitor 48, potentiometer 49, and constant current source 47. Upon receiving a trigger pulse, monostable multivibrator 57, in this case a 555 I.C., begins charging timing capacitor 48 through potentiometer 49. The rate at which timing capacitor 48 charges is determined by the amount of current supplied by constant current source 47 and by the current limiting effect of potentiometer 49. The constant charging current thus insures a linear rate of change in the voltage across timing capacitor 48. The resulting linearly increasing voltage is presented in the $V_{IN}$ pin of V-F converter 27. A National Semiconductor LM 331 may be utilized for this purpose. Scaling potentiometer 50 adjusts the ratio of output frequency to input voltage. Output pin $F_{OUT}$ of V-F converter 27 is connected to count input line 28 of counter 29. Counter 29 sums the pulses received from V-F converter 27 as long as inhibit line 30 of said counter 29 is held at logic 1. Period generator 21, which comprises flip-flops 41 and 42, functions as a divide-by-three circuit. The Q output of flip-flop 42 goes to logic 1 when the first pulse from the photo-gate is received at the clock input of flip-flop 41. The Q output of flip-flop 42 remains at logic 1 until a total of three pulses have been received at the clock input of flip-flop 41. When the third pulse arrives at said input of flip-flop 41, the Q output of flip-flop 42 switches states and resets multivibrator 57 thus terminating the ramp cycle. Upon reset, the logic output pin of multivibrator 57 switches to logic 0. Said logic output pin is coupled to one input of NAND gate 45 in the reset/inhibit latch circuit via capacitor 46. As capacitor 46 charges, said input of NAND gate 45 is momentarily pulled low, causing the reset/inhibit latch circuit to change states. Count inhibit bar line 56 goes to logic 0, this inhibiting counter 29, and reset line 55 goes to logic 1 thereby resetting flip-flops 41 and 42. The four digit output of counter 29 interfaces with liquid crystal display 16. Voltage regulator 51 provide +5volts to the circuit when powered by 9 volt transistor radio battery 59 through on/off switch 58. Said battery 58 exhibits a useful lifetime of 3 to 4 months in regular use.

Calibration of the apparatus can be accomplished by making use of the aforementioned potentiometers 49 and 50. Potentiometer 49 controls the time constant of the ramp generator circuit. Said potentiometer 49 is adjusted so that said time constant is fractionally longer than the longest expected period of oscillation for the range of objects to be tested. Scaling potentiometer 50 is then adjusted so that the scaling factor of V-F converter 27, in units of pulses per second per volt, times the slope of the ramp voltage signal in volts per second, is equal in magnitude to the coefficient of torsion for spiral coil spring 9, divided by $4\pi^2$. In the absence of specific knowledge of the coefficient of torsion, a calibration reference of known moment of inertia can be used to adjust scaling potentiometer 50 so that the correct value is displayed.

A measurement of moment of inertia may be made by first positioning a test object on test platform 1 such that the center of mass of said test object is coincident with the axis of rotation of shaft 2. The test platform, with the test object resting thereon, is rotated to an angle of 45 to 60 degrees relative to the equilibrium position. The counter is then zeroed by way of the rest switch. Releasing the test platform allows the torsional pendulum to being oscillating. As the pendulum passes through the equilibrium position, the counter begins incrementing. On completion of a full cycle of oscillation, the counter ceases incrementing, and the measured moment of inertia is displayed.

We claim as our invention:

1. An apparatus for making a direct measurement of the moment of inertia of an object about an axis of rotation, comprising;

a rotational pendulum consisting of a circular platform of low moment of inertia, a means of vertical support extending from the central axis of said circular platform through the central aperture of a means of lateral support, said lateral support allowing rotational freedom to said circular platform and vertical support means about said central axis and being secured to a rigid structure, and a spiral coil spring member conjoined with said vertical support via threaded fastener to one end of said spiral coil spring member at its central axis, the body of said spiral coil spring member lying in a horizontal plane, perpendicular to the axis of rotation of said circular platform, and secured at its other end to the aforementioned rigid structure, said rotational pendulum exhibiting rotational oscillation in response to the torque impressed upon the circular platform through its cooperative members by the resilience of the spiral coil spring member as the consequence of an initial angular displacement, the period of said oscillation being proportional to the square root of the moment of inertia of said rotational pendulum and any load resting thereon, means of quantifying the period of oscillation by generating a pulse of a duration equal to said period comprising a photogate that senses the passage of said rotational pendulum through the equilibrium position, and a divide by three circuit which is driven by the output of said photogate and endeavors to define the rotational period of said rotational pendulum to be three pulses from said photogate.

means for generating a voltage that increases with time a constant rate, said rate being adjustable, means to generate squarewave pulses at a frequency related by a constant to the voltage at the input of said squarewave pulse generating means, said constant being adjustable, and said frequency being equal at any time during the rotational period to the product of the voltage rate of change and frequency to voltage ratio, means of counting squarewave pulses produced by said squarewave pulse generating means for a period of time determined by the duration of the pulse generated by the period quantifying means, said counting means thereby integrating the product of the voltage rate of change, the frequency to voltage ratio, and the period of oscillation with respect to time, the result of said integration being equal to the product of the voltage rate of change, the frequency to voltage ratio, and the square of the period of oscillation, and means for displaying then number registered by said counting means.

* * * * *